United States Patent
Hild et al.

(10) Patent No.: US 11,215,446 B2
(45) Date of Patent: Jan. 4, 2022

(54) COMPUTER-IMPLEMENTED METHOD FOR IDENTIFYING MECHANICAL PROPERTIES BY COUPLED CORRELATION OF IMAGES AND MECHANICAL MODELLING

(71) Applicants: CENTRE NATIONAL DE LA RECHERCHE SCIENTIFIQUE, Paris (FR); ECOLE NORMALE SUPERIEURE DE CACHAN, Cachan (FR)

(72) Inventors: François Hild, Chatenay-Malabry (FR); Hugo Leclerc, Cachan (FR); Stéphane Roux, Rosny-sous-Bois (FR)

(73) Assignees: CENTRE NATIONAL DE LA RECHERCHE SCIENTIFIQUE, Paris (FR); ECOLE NORMALE SUPERIEURE DE CACHAN, Cachan (FR)

(*) Notice: Subject to any disclaimer, the term of this patent is extended or adjusted under 35 U.S.C. 154(b) by 0 days.

(21) Appl. No.: 16/976,425

(22) PCT Filed: Feb. 28, 2018

(86) PCT No.: PCT/EP2018/054953
§ 371 (c)(1),
(2) Date: Aug. 27, 2020

(87) PCT Pub. No.: WO2019/166085
PCT Pub. Date: Sep. 6, 2019

(65) Prior Publication Data
US 2021/0003389 A1    Jan. 7, 2021

(51) Int. Cl.
*G01B 11/16*    (2006.01)
*G06T 7/32*    (2017.01)
(Continued)

(52) U.S. Cl.
CPC ............ *G01B 11/16* (2013.01); *G01B 15/06* (2013.01); *G01M 5/005* (2013.01); *G06F 30/17* (2020.01);
(Continued)

(58) Field of Classification Search
CPC .......... G01B 11/16; G01B 15/06; G06T 7/32; G06T 7/97; G06T 2207/10072;
(Continued)

(56) References Cited

U.S. PATENT DOCUMENTS

| 7,257,244 B2 | 8/2007 | Miga |
| 9,644,948 B2 * | 5/2017 | Wieneke ................ G01B 11/16 |
| 2013/0114088 A1 * | 5/2013 | Newman ............. G01M 5/0058 356/520 |

OTHER PUBLICATIONS

Julien Rethore "An extended and integrated digital image correlation technique applied to the analysis of fractured samples: The equilibrium gap method as a mechanical filter" (Year: 2009).*

(Continued)

Primary Examiner — Regis J Betsch
Assistant Examiner — Kaleria Knox
(74) Attorney, Agent, or Firm — BakerHostetler

(57) ABSTRACT

A computer-implemented method for identifying mechanical parameters of an object subjected to mechanical stress is provided. The method comprises a step of acquiring, by an imaging means, images of the object taken before and during the application of the mechanical stress, three steps of calculating the effects due to the stress carried out either on the basis of the modeling of the recorded images or on the basis of a theoretical mechanical modeling of the stress, a step of defining a functional equal to the difference between the two models and a last step of minimizing said functional so that the experimental model is as close as possible to the theoretical mechanical model. Additional measurements make it possible to refine the method.

12 Claims, 3 Drawing Sheets

(51) Int. Cl.
  *G06T 7/00* (2017.01)
  *G06F 30/23* (2020.01)
  *G06F 30/17* (2020.01)
  *G01B 15/06* (2006.01)
  *G01M 5/00* (2006.01)
  *G06F 111/10* (2020.01)

(52) U.S. Cl.
  CPC ............... *G06F 30/23* (2020.01); *G06T 7/32* (2017.01); *G06T 7/97* (2017.01); *G06F 2111/10* (2020.01); *G06T 2207/10072* (2013.01)

(58) Field of Classification Search
  CPC ...... G06F 30/23; G06F 30/17; G06F 2111/10; G01M 5/005; G01M 5/0058
  See application file for complete search history.

(56) References Cited

OTHER PUBLICATIONS

"Identification of damage and cracking behaviours based on energy dissipation mode analysis in a quasi-brittle material using Digital Image Correlation" Paul Leplay (Year: 2012).*

S. Arvil "General framework for the identification of constitutive parameters from full-field measurements in linear elasticity" (Year: 2006).*

Sutton, et al., "Image correlation for shape, motion and deformation measurements: basic concepts, theory and applications", Springer, (2009).

Réthoré, "A fully integrated noise robust strategy for the identification of constitutive laws from digital images", Int. J. Num. Meth. Eng., 84, pp. 631-660, (2010).

Rethore, et al., "An extended and integrated digital image correlation technique applied to the analysis of fractured samples", European Journal of Computational Mechanics, vol. 18, Issue 3-4, pp. 285-306, 2009.

Leplay, et al., "Identification of damage and cracking behaviours based on energy dissipation mode analysis in a quasi-brittle material using Digital Image Correlation", International Journal of Fracture, vol. 171, No. 1, pp. 35-50, Oct. 4, 2011.

Rethore, et al., "A fully integrated noise robust strategy for the identification of constitutive laws from digital images", International Journal of numerical methods in engineering, vol. 84, No. 6, pp. 631-660, Apr. 20, 2010.

Avril, et al., "General framework for the identification of constitutive parameters from full-field measurements in linear elasticity", International Journal of Solids and Structures, vol. 44, Issues 14-15, pp. 4978-5002, Mar. 30, 2007.

* cited by examiner

COMPUTER-IMPLEMENTED METHOD FOR IDENTIFYING MECHANICAL PROPERTIES BY COUPLED CORRELATION OF IMAGES AND MECHANICAL MODELLING

CROSS-REFERENCE TO RELATED APPLICATIONS

This application is a National Stage of International patent application PCT/EP2018/054953, filed on Feb. 28, 2018, the disclosure of which is incorporated by reference in its entirety.

FIELD OF THE INVENTION

The general field of the invention is that of materials and structural science, and more precisely that of the knowledge of the properties or materials and structures when they are subjected to various mechanical stresses.

BACKGROUND

The main industrial applications relate to the strength of materials. However, there are other fields of application such as non-destructive testing, certain biological applications or elastography for medical purposes.

Generally, measurements are taken by means of mechanical test systems comprising imaging devices. These devices are mainly video cameras or still cameras operating in visible or close-to-visible wavelengths or microscopic analysis systems such as scanning electron microscopes or atomic force microscopes. Tomography apparatuses are also used to analyze the entire volume of a material sample. There are various types of such apparatuses. Mention will be made, non-exhaustively, of X-ray tomography apparatuses, magnetic resonance tomography apparatuses or "MRI" and optical coherence tomography apparatuses.

The general principle of operation of these imaging devices is as follows. A certain number of images representative of the sample are taken before and then during the application of determined mechanical or thermal loading conditions, for example. These images may be two-dimensional, stereoscopic or video, or even volume images. Of course, knowledge of the scale of the sample is essential if it is desired to identify mechanical properties that have a physical dimension.

There are various ways of using the images obtained that make it possible to characterize the effect of the loading. These images may be used by means of digital image correlation (CIN), a method also known by the acronym "DIC". Reference will be made in particular to the publication "Image correlation for shape, motion and deformation measurements: basic concepts, theory and applications", M A Sutton, J J Orteu, H Schreier, Springer (2009). This method consists in breaking down the movement of the sample on a representative kinematic base. Such a base may be a "finite element"-type description based on a geometric mesh of the sample. Analyzing the images obtained under load in comparison with that or those obtained without load makes it possible to measure the displacement field $U_{CIN}(x)$ of the sample under stress, x representing the coordinates of a point of the sample. This general principle of characterization by the digital image correlation method is shown in FIG. 1.

The same mechanical test may be modeled numerically, either by means of the finite element method, or by means of other techniques, to calculate the displacement field which is then denoted by $U_{CAL}(x)$.

Modeling requires knowledge:
of the geometry of the sample;
of the loading conditions, including time;
of the boundary conditions such as the measurement of displacements or forces at the edges of the domains;
of the laws of mechanical behavior of the sample or of the various phases which make it up;
of the precise location of the various phases, for a multiphasic medium.

These various elements may be described mathematically via a set of parameters collectively called $\{p_i\}$, i being an index varying from 1 to n, n being the number of parameters in question. This general principle of characterization by modeling is shown in FIG. 2.

Of course, modeling faithfully represents the observations only if the displacement field $U_{CAL}(x)$ is identical or very close to the displacement field $U_{CIN}(x)$. Consequently, the optimization of the parameters $\{p_i\}$ is achieved by means of an iteration loop in which the parameters are modified until the two displacement fields correspond to each other to the best possible degree. FIG. 3 shows the entire process of measuring, modeling and optimizing that makes it possible to determine the correct parameters.

This method has some drawbacks. Specifically, the images are always noisy and DIC is sensitive to this noise to a greater or lesser extent depending on the choice of kinematic base. The effect is particularly pronounced at the edges of the domain being studied. The main drawback of modeling is that the sensitivity of the displacement field relative to certain parameters may be very low, making them difficult to determine. There may even be a contamination effect across all of the parameters $\{p_i\}$. Lastly, despite measurement imperfections, this field is inalterable throughout the identification procedure.

In order to optimize the method, various methods have been proposed. Thus, U.S. Pat. No. 7,257,244 entitled "Elastography imaging modalities for characterising properties of tissue" describes, within the limited context of elastography, an iterative method for coupling between the correlation of images and the modeling of the elastic properties of the sample in question until the best coincidence between the images is obtained. In this method, the boundary conditions are assumed to be known and are not reconsidered during the iterations.

Another method has been proposed in the publication by J. Réthoré entitled "A fully integrated noise robust strategy for the identification of constitutive laws from digital images", published in Int. J. Num. Meth. Eng. 84:631-660 (2010). This method associates identification and DIC, by introducing a functional to be minimized which associates the two objectives by imposing the identity of the two displacement fields. The identification part is performed by minimizing the deviation from equilibrium, which is a quadratic functional based on a second-order differential operator applied to the displacement. Its minimization therefore involves a fourth-order differential operator with respect to displacement U.

The image correlation described is a global method based on a "finite element"-type discretization of the displacement fields. Minimizing the deviation from equilibrium and the quadratic difference of the images between the reference image and the distorted image once corrected of the current displacement field for one and the same displacement field makes it possible to find a compromise between the measurements obtained by DIC and identification, which is optimized with respect to the target constitutive parameters {p}. The boundary conditions, where the transmitted forces are non-zero, directly and exclusively result from the image correlation. This method provides an identification of the constitutive laws, elastic then non-linear, via the coincidence of the images. It should however be emphasized that the measurement of edge displacements is heavily affected by noise and that the use of a quadratic functional based on second derivatives of the displacement U, giving rise by minimization to a fourth-order differential operator, results in a strongly exacerbated sensitivity to noise. The examples treated by this method clearly demonstrate the substantial increase in the error near the edges where the kinematics are imposed. In situations less favorable than those used in the reference, these boundary conditions may even prevent the mechanical properties being determined correctly. It is thus observed that, even if the proposed DIC/identification coupling addresses some of the objections mentioned above, other weaknesses remain which may limit quantitative identification capabilities.

SUMMARY OF THE INVENTION

More specifically, one subject of the invention is a computer-implemented method for identifying at least one mechanical parameter called "target parameter" of an object subjected to a mechanical stress, characterized in that said method comprises the following steps:

Step 1: acquiring, by an imaging means, at least two images of the object taken before and during the application of the mechanical stress and measuring the scale factor of the object;

Step 2: calculating a first functional $T_{CIN}(U_{CIN})$ corresponding to the correlation of the digital images depending on the displacement field $U_{CIN}$ represented using a first kinematic base, said displacement field $U_{CIN}$ being measured at any point of the object under stress between the images of the object under load and without load;

Step 3: calculating the calculated displacement field $U_{CAL}$ at any point of the object;

Step 4: calculating a second functional $T_{CAL}(U_{CAL},\{p\},\{q\})$ on the basis of the calculated displacement field $U_{CAL}$ represented using a second kinematic base, this second functional corresponding to the variational formulation of a mechanical model of the stress depending on the geometry of the object, the forces applied, the boundary conditions, at least the target parameter {p} and predetermined mechanical parameters {q};

Step 5: calculating a third functional $T_{PAR}(U_{CIN},U_{CAL})$ in the form of a quadratic norm, equal to the difference between $U_{CIN}$ and $U_{CAL}$;

Step 6: minimizing, with respect to $U_{CIN}$, $U_{CAL}$ and {p}, a total functional $T_{TOT}(U_{CIN},U_{CAL},\{p\},\{q\})$ comprising at least the terms:

$$T_{TOT}(U_{CIN},U_{CAL},\{p\},\{q\})=\alpha T_{CIN}(U_{CIN})+\beta T_{CAL}(U_{CAL},\{p\},\{q\})+\gamma T_{PAR}(U_{CIN},U_{CAL})$$

$\alpha,\beta$ and $\gamma$ being three non-zero weighting coefficients, said weighting coefficients $(\alpha,\beta,\gamma)$ being adjusted according to the uncertainties associated with the various quantities involved in the functionals, and/or according to the condition number of the problem tangent to the minimization of the functional $T_{TOT}$.

Advantageously, when the behavior of the object is subjected to a time-dependent stress, the second functional $T_{CAL}(U_{CAL}, \{p\}, \{q\})$ is dependent on determined times.

Advantageously, step 1 of the method comprises additional measurements $F_{MES}$ of forces, times or temperatures, step 3 of the method comprises evaluations FOAL corresponding to said additional measurements, step 4 is followed by a step 4bis of calculating a fourth functional $T_{FOR}(F_{CAL}, F_{MES})$ proportional to the quadratic deviation between these quantities and the total functional $T_{TOT}(U_{CIN},U_{CAL},\{p\},\{q\})$ of step 5 is equal to:

$$T_{TOT}(U_{CIN},U_{CAL},\{p\},\{q\})=\alpha T_{CIN}(U_{CIN})+\beta T_{CAL}(U_{CAL},\{p\},\{q\})+\gamma T_{PAR}(U_{CIN},U_{CAL})+\chi T_{FOR}(F_{CAL}(\{p\},\{q\}),F_{MES})$$

$\chi$ being a fourth weighting coefficient adjusted according to the uncertainties associated with the various quantities involved in the functionals, and/or according to the condition number of the problem tangent to the minimization of the functional $T_{TOT}$.

Advantageously, the minimization of the total functional $T_{TOT}$ is carried out by iterative method, which may or may not require the calculation of the gradient of $T_{TOT}$.

Advantageously, the first kinematic base is identical to the second kinematic base.

Advantageously, the measurement uncertainty is estimated by the Hessian of the functional $T_{TOT}$ with convergence by having a measurement of the acquisition noise available.

Advantageously, the first kinematic base or the second kinematic base is produced on a finite element mesh.

Another subject of the invention is a computer device suitable for identifying at least one mechanical parameter according to the method described above.

Another subject of the invention is a computer-readable medium with program for executing the method according to the method described above.

BRIEF DESCRIPTION OF THE DRAWINGS

The invention will be better understood and other advantages will become apparent on reading the description that follows, which is provided without limitation, and by virtue of the appended figures, in which.

DETAILED DESCRIPTION

Figure 1:
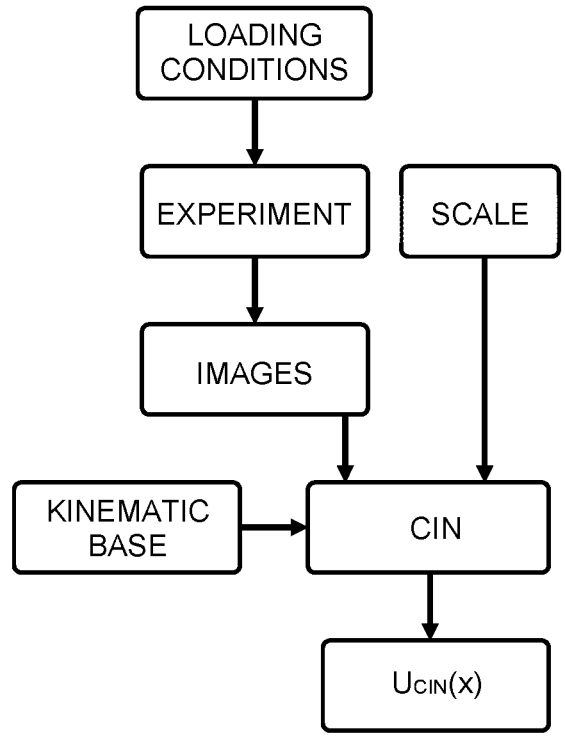
FIG. 1, already described, shows the various steps in the representation of a stress in a sample using monitoring by means of the digital image correlation method known as CIN (DIC)
Figure 2:
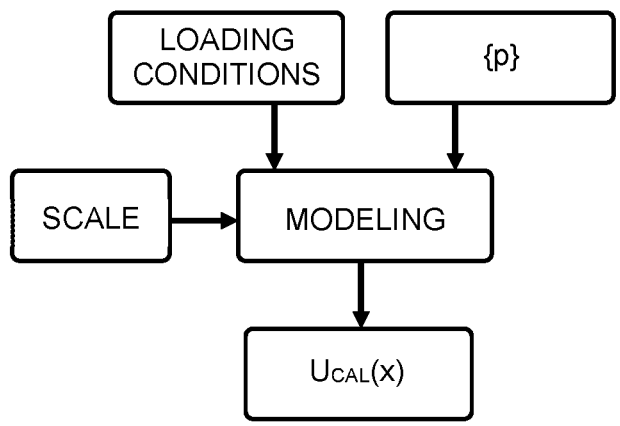
FIG. 2, already described, shows the various steps in the representation of a stress in a sample by means of the modeling method.
Figure 3:
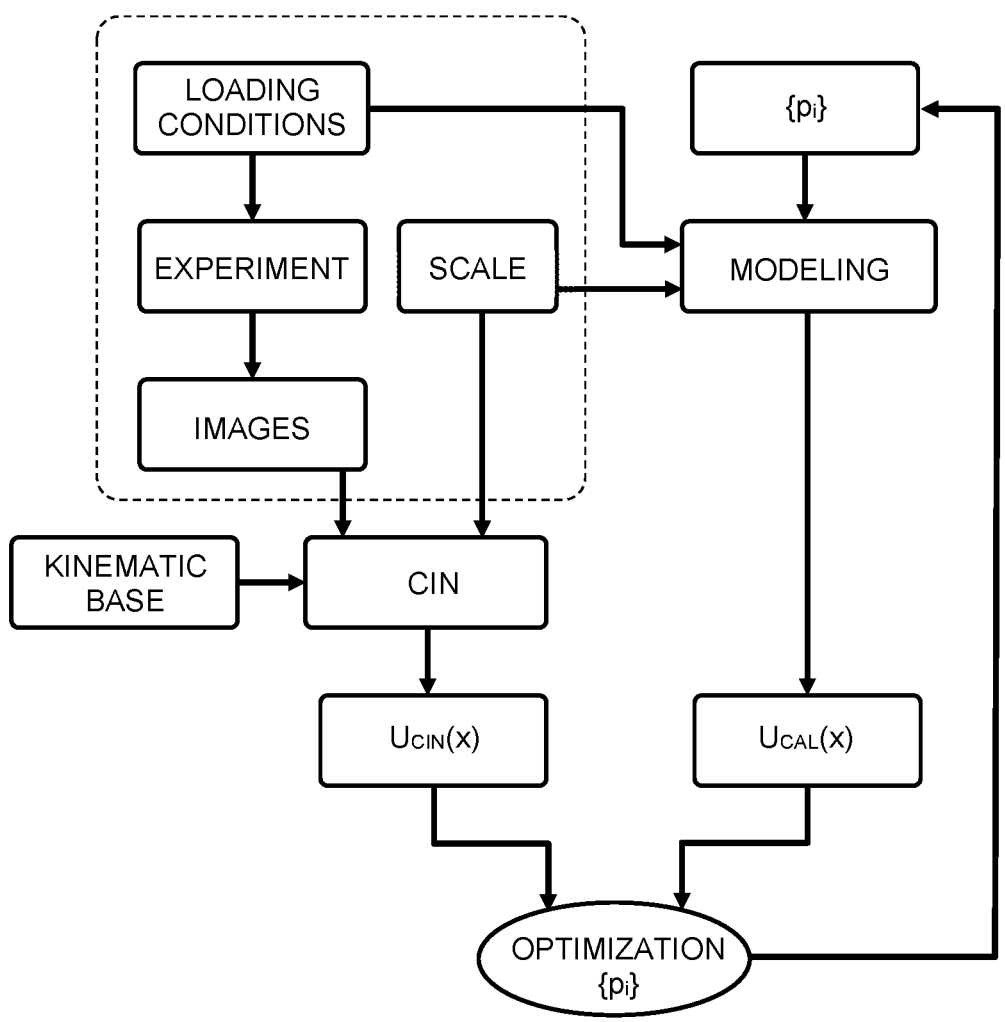
FIG. 3, already described, shows the various steps in the optimization of the target parameters {p} such as the mechanical properties, the geometry or the boundary conditions by means of the iterative method according to the prior art.
Figure 4:
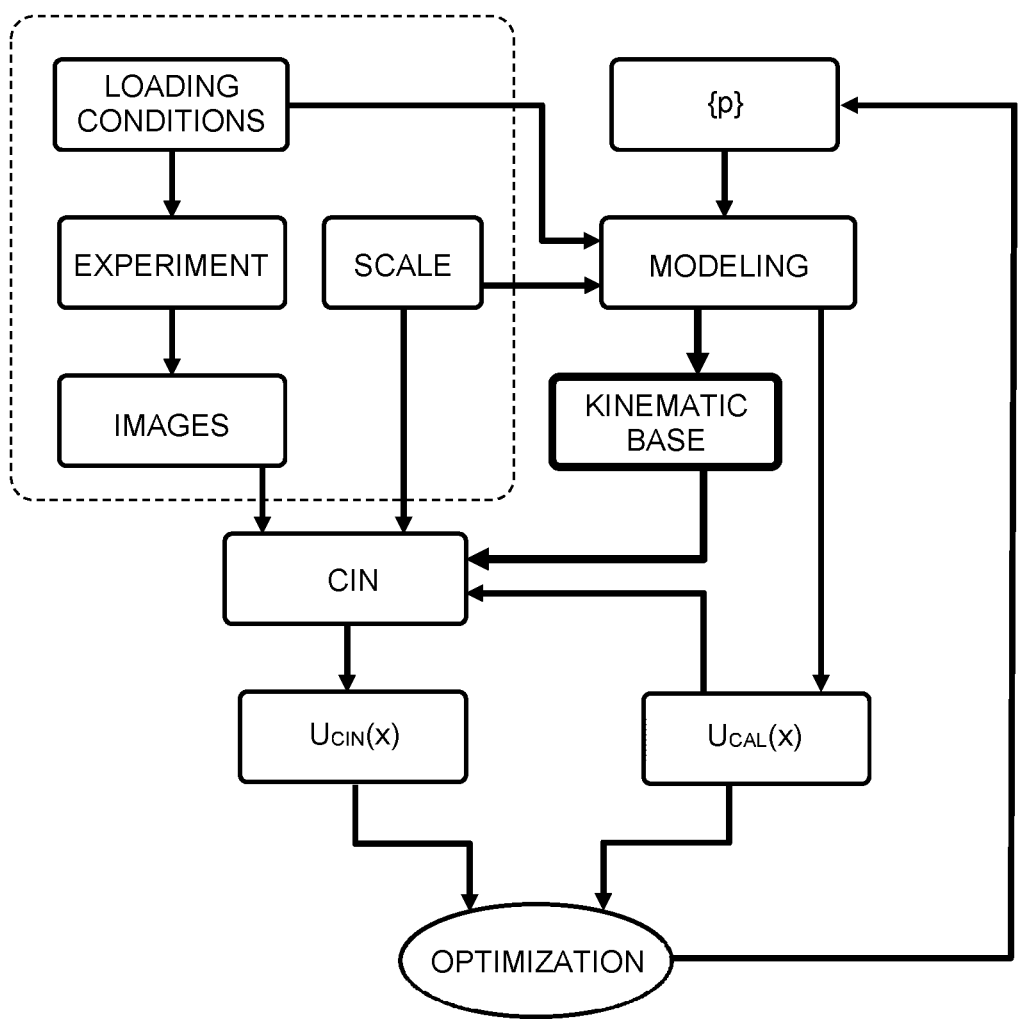
FIG. 4 shows the various steps in the optimization of the target parameters by means of the iterative global method according to the invention.

By way of example, FIG. 4 shows the various steps in the optimization of the target parameters by means of the iterative global method according to the invention. If the method according to the invention is compared with the method according to the prior art of FIG. 3, the main change between the two methods is the position of the calculation of the kinematics, in particular with regard to the boundary conditions. In the method according to the invention, the modeling also intervenes in these kinematics which are therefore no longer constant but form part of the optimization loop.

The computer-implemented method for identifying at least one mechanical parameter called "target parameter" of a constitutive material of a test piece or of a part subjected to a known mechanical stress according to the invention comprises the steps described below.

A first step comprises acquiring digital images of the object taken before, during and, for certain applications, after the application of the mechanical stress, by an imaging means, and measuring the scale factor of the object. Indeed, knowledge of the scale of the sample is essential if it is desired to identify mechanical properties that have a physical dimension.

The imaging means may be any device used alone or in combination that makes it possible to obtain at least one image of the object. The images obtained by said means may be optical images obtained in various ranges of wavelengths well known to those skilled in the art.

Second, a first functional $T_{CIN}$ is calculated on the basis of the images acquired using the chosen method. This first functional corresponds to the correlation of the digital images on the basis of the displacement field $U_{CIN}$ represented using a first relevant kinematic base, for example, on a finite element mesh.

Conventionally, this first functional is the sum, over the region being studied, of the quadratic difference between the reference image and one or more corrected distorted images of the displacement field, but other criteria such as intercorrelation or the joint entropy of information may be chosen.

This first step of the method may include additional measurements $F_{MES}$ such as force, time or temperature measurements.

A third step consists in calculating the calculated displacement field $U_{CAL}$ represented using a second kinematic base, this second functional corresponding to the variational formulation of a mechanical model of the stress depending on the geometry of the object, the forces applied, the boundary conditions, at least the target parameters $\{p\}$ and predetermined mechanical parameters $\{q\}$.

Indeed, the same mechanical test may be modeled numerically, either by means of the finite element method, or by means of other techniques, to calculate the displacement field which is then denoted by $U_{CAL}(x)$.

A fourth step consists in calculating a second functional $T_{CAL}(U, \{p\}, \{q\})$ depending on the mechanical behavior of the one or more materials, the geometry of the part, the boundary conditions potentially including the applied forces and the time or times in question gathered together in the form of target $\{p\}$ or predetermined $\{q\}$ parameters and a set of nominal values for the target parameters. This fourth step of the method may include evaluations of force, time or temperature $F_{CAL}$ corresponding to additional measurements $F_{MES}$, if they are available, making it possible to formulate an additional functional $T_{FOR}(F_{CAL}, F_{MES})$ proportional to the quadratic difference of these last two quantities, potentially weighted by the inverse of the variances of the measurements.

In a fifth step, a third functional $T_{PAR}(U_{CAL}, U_{CIN})$ is introduced in the form of the quadratic norm of the difference between $U_{CIN}$ and $U_{CAL}$. The two displacement fields merge, along with the other physical quantities measured and calculated if the target parameters are well identified and the predetermined parameters are appropriate, as well as the model used.

Thus, the principle of the proposed identification is to minimize, in a last step, the weighted sum $T_{TOT}$ of these three or four functionals:

$$T_{TOT}(U_{CIN}, U_{CAL}, \{p\}, \{q\}) = \alpha T_{CIN}(U_{CIN}) + \beta T_{CAL}(U_{CAL}, V, \{p\}, \{q\}) + \gamma T_{PAR}(U_{CIN}, U_{CAL}) + \chi T_{FOR}(F_{CAL}(\{p\}, \{q\}), F_{MES})$$

with respect to the two displacement fields $U_{CAL}$ and $U_{CIN}$, as well as to the target parameters $\{p\}$. This functional $T_{TOT}$ is reduced to its first three terms in the case where the method does not include additional measurements.

It should be noted that the problem may remain ill-posed if the range of stresses, the geometry, or even the definition of the images are unsuitable. In this circumstance, not all of the target parameters can be measured. A Tikhonov regularization, which corresponds to a penalization of the deviation between identified and expected parameters, may then be necessary to allow the problem to be solved numerically. The solution obtained should then be judged using its own uncertainty, for example, by considering the effect of measurement noise characterized beforehand on the minimization of $T_{TOT}$, and without taking the Tikhonov regularization into account.

The weighting coefficients ($\alpha, \beta, \gamma, \chi$) make it possible to give greater or lesser importance to the various terms according to the uncertainties associated with the quantities involved in the functionals and/or according to the condition number of the problem tangent to the minimization of the functional $T_{TOT}$. It should be noted that any of the arbitrarily chosen weights may be set to 1.

If the variational expression of the mechanical model is not directly accessible, it should be noted that the minimization of the functional $T_{PAR}$ with respect to $U_{CAL}$ is simply expressed for example in a finite element code by a linear elastic connection giving rise at each node to a nodal force proportional to the deviation between $U_{CAL}$ and $U_{CIN}$. Thus, with respect to finite element modeling performed using a current professional computer code, able to include arbitrarily complex constitutive laws, the proposed formulation of $T_{TOT}$ in its minimization with respect to $U_{CAL}$ simply requires the introduction of an additional linear elastic connection at each node of the mesh. The solution obtained will be exactly that which minimizes the total functional with fixed $U_{CIN}$, $\{p\}$ and $\{q\}$. By alternating the minimization steps with respect to different subsets of unknowns, it is possible to reach the target minimization if the problem is well posed.

This minimization of the functional $T_{TOT}$ may be performed, for example, by means of a Newton-Raphson method, via successive linearizations and corrections.

Advantageously, the Hessian of the functional $T_{TOT}$ with convergence makes it possible to estimate the measurement uncertainty if a measurement of the acquisition noise is available, for example, via repeated acquisitions without stresses before performing the mechanical test. In particular, the well-posed character of the problem corresponding to strictly positive eigenvalues and in this case the condition number corresponding to the spectral radius of the Hessian may be appreciated. Otherwise, a Tikhonov regularization may be proposed.

Advantageously, these elements also make it possible to validate or invalidate the model. Specifically:

the displacement field $U_{CIN}$ makes it possible to estimate the residual field of the image correlation, that is to say the difference between the distorted and corrected images of the $U_{CIN}$ displacement field and the reference image;

the modeling makes it possible to validate that the constitutive law and the equilibrium conditions are satisfied;

any additional measurements which may be available are compared with those resulting from the modeling;

the two displacement fields, one close to the measurement, $U_{CIN}$, and the other close to the model, $U_{CAL}$, are combined within one and the same functional gauging the consistency of the two approaches.

Thus, each of the functionals used provides its own validation. Conversely, residuals that are too large to be compatible with acquisition noise signal model or measurement errors and provide indications as to how to enrich the interpretive model or to identify unanticipated measurement artifacts.

Advantageously, the coupling of the various terms of the functional makes it possible to compensate for the ill-posed or ill-conditioned character of this or that functional. For example, a region of low contrast or insufficient lighting may not allow the measurement of $U_{CIN}$ using the functional $T_{CIN}$ alone. The functional $T_{PAR}$ may then compensate for the lack of information by calculation.

Symmetrically, when the constitutive law or the geometrical non-linearities induce a loss of stability or uniqueness of the mechanical problem solution then the coupling functional $T_{PAR}$ may make it possible to restore the well-posed character of the problem and to follow via the model the same bifurcation branch.

With convergence, the total functional reaches its minimum for a displacement field $U_{CIN}$, a distinct calculated displacement field $U_{CAL}$, values of forces, times or temperature or other physical quantities of the model $F_{CAL}$ and an estimate of the target parameters $\{p\}$ for the identification proper. These parameters may be parameters of the material, relate to one or more phases, or the geometry of the object or other quantities (e.g. boundary conditions).

The method is implemented by computer, thus making it possible to adapt a computer device for the identification of at least one mechanical parameter according to the method described above.

Consequently, the method according to the invention may be implemented essentially by numerical calculation means which are perfectly achievable using current computing tools, but which in practice make it possible to analyze a wider range of materials, or with less expensive hardware, in particular in relation to the quality of the acquisition hardware for a given end result.

The invention claimed is:

1. A computer-implemented method for identifying at least one mechanical parameter called a "target parameter" of an object subjected to a mechanical stress, wherein said computer-implemented method comprises the following steps:

Step 1: acquiring, by an imaging means, at least two digital images of the object taken before and during an application of the mechanical stress and measuring a scale factor of the object;

Step 2: calculating with a computer a first functional $T_{CIN}(U_{CIN})$ corresponding to a correlation of the at least two digital images depending on a displacement field $U_{CIN}$ represented using a first kinematic base, said displacement field $U_{CIN}$ being measured at any point of the object under stress between the at least two digital images of the object under load and without load;

Step 3: calculating with the computer a calculated displacement field $U_{CAL}$ at any point of the object;

Step 4: calculating with the computer a second functional $T_{CAL}(U_{CAL},\{p\},\{q\})$ on a basis of the calculated displacement field $U_{CAL}$ represented using a second kinematic base, this second functional corresponding to a variational formulation of a mechanical model of the stress depending on a geometry of the object, forces applied, boundary conditions, at least a target parameter $\{p\}$ and predetermined mechanical parameters $\{q\}$;

Step 5: calculating with the computer a third functional $T_{PAR}(U_{CIN},U_{CAL})$ in a form of a quadratic norm, equal to a difference between $U_{CIN}$ and $U_{CAL}$; and Step 6: minimizing with the computer, with respect to $U_{CIN}$, $U_{CAL}$ and $\{p\}$, a total functional $T_{TOT}(U_{CIN}, U_{CAL},\{p\},\{q\})$ comprising at least the terms:

$$T_{TOT}(U_{CIN},U_{CAL},\{p\},\{q\})=\alpha T_{CIN}(U_{CIN})+\beta T_{CAL}(U_{CAL},\{p\},\{q\})+\gamma T_{PAR}(U_{CIN},U_{CAL})$$

$\alpha,\beta$ and $\gamma$ being three non-zero weighting coefficient, wherein the step of minimizing with the computer identifies the "target parameter" that relates to at least one of the following: a mechanical property of a constitutive material of the object, one or more phases of the object, a geometry of the object, and/or quantities of the object; and wherein the imaging means comprises at least one of the following: a video camera, a still camera, a scanning electron microscope, an atomic force microscope, a tomography apparatus, an X-ray tomography apparatus, a magnetic resonance tomography apparatus, and/or an optical coherence tomography apparatus.

2. The computer-implemented method for identifying at least one mechanical parameter as claimed in claim 1, wherein when a behavior of the object is subjected to a time-dependent stress, the second functional $T_{CAL}(U_{CAL}, \{p\}, \{q\})$ is dependent on determined times.

3. The computer-implemented method for identifying at least one mechanical parameter as claimed in claim 1, wherein step 1 of the method comprises additional measurements $F_{MES}$ of forces, times or temperatures, step 3 of the method comprises evaluations $F_{CAL}$ corresponding to said additional measurements, step 4 is followed by a step 4bis of calculating a fourth functional $T_{FOR}(F_{CAL},F_{MES})$ proportional to a quadratic deviation between these quantities and a total functional $T_{TOT}(U_{CIN},U_{CAL},\{p\},\{q\})$ of step 5 is equal to:

$$T_{TOT}(U_{CIN},U_{CAL},\{p\},\{q\})=\alpha T_{CIN}(U_{CIN})+\beta T_{CAL}(U_{CAL},\{p\},\{q\})+\gamma T_{PAR}(U_{CIN},U_{CAL})+\chi T_{FOR}(F_{CAL}(\{p\},\{q\}),F_{MES})$$

$\chi$ being a fourth weighting coefficient, said weighting coefficient $\chi$ is adjusted according to uncertainties associated with various quantities involved in the functionals, and/or according to a condition number of a problem tangent to the minimization of the functional $T_{TOT}$.

4. The computer-implemented method for identifying at least one mechanical parameter as claimed in claim 1, wherein the minimization of the total functional $T_{TOT}$ is carried out by iterative method.

5. The computer-implemented method for identifying at least one mechanical parameter as claimed in claim 1, wherein the minimization of the total functional $T_{TOT}$ is carried out by iterative method, requiring the calculation of a gradient of $T_{TOT}$.

6. The computer-implemented method for identifying at least one mechanical parameter as claimed in claim 1, wherein the first kinematic base is identical to the second kinematic base.

7. The computer-implemented method for identifying at least one mechanical parameter as claimed in claim 1, wherein a measurement uncertainty is estimated by a Hessian of the functional $T_{TOT}$ with convergence by having a measurement of acquisition noise available.

8. The computer-implemented method for identifying at least one mechanical parameter as claimed in claim 1, wherein the first kinematic base or the second kinematic base is produced on a finite element mesh.

9. A computer device suitable for identifying at least one mechanical parameter as claimed in claim 1.

10. A computer-readable medium with program for executing the method as claimed in claim 1.

11. A mechanical test system configured to identify at least one mechanical parameter called a "target parameter" of an object subjected to a mechanical stress, wherein said the mechanical test system comprises:
an imaging device configured to acquire at least two digital images of the object taken before and during an application of the mechanical stress and measuring a scale factor of the object;
a computer configured to calculate a first functional $T_{CIN}(U_{CIN})$ corresponding to a correlation of the at least two digital images depending on a displacement field $U_{CIN}$ represented using a first kinematic base, said displacement field $U_{CIN}$ being measured at any point of the object under stress between the at least two digital images of the object under load and without load;
the computer further configured to calculate a calculated displacement field $U_{CAL}$ at any point of the object;
the computer further configured to calculate a second functional $T_{CAL}(U_{CAL},\{p\},\{q\})$ on a basis of the calculated displacement field $U_{CAL}$ represented using a second kinematic base, this second functional corresponding to a variational formulation of a mechanical model of the stress depending on a geometry of the object, forces applied, boundary conditions, at least a target parameter $\{p\}$ and predetermined mechanical parameters $\{q\}$;
the computer further configured to calculate a third functional $T_{PAR}(U_{CIN},U_{CAL})$ in a form of a quadratic norm, equal to a difference between $U_{CIN}$ and $U_{CAL}$; and
the computer further configured to calculate a minimization of, with respect to $U_{CIN}$, $U_{CAL}$ and $\{p\}$, a total functional $T_{TOT}(U_{CIN},U_{CAL},\{p\},\{q\})$ comprising at least the terms:

$$T_{TOT}(U_{CIN},U_{CAL},\{p\},\{q\})=\alpha T_{CIN}(U_{CIN})\beta T_{CAL}(U_{CAL},\{p\},\{q\})\gamma T_{PAR}(U_{CIN},U_{CAL})$$

$\alpha, \beta$ and $\gamma$ being three non-zero weighting coefficients,
wherein the step of minimizing with the computer identifies the "target parameter" that relates to at least one of the following: a mechanical property of a constitutive material of the object, one or more phases of the object, a geometry of the object, and/or quantities of the object; and
wherein the imaging device comprises at least one of the following: a video camera, a still camera, a scanning electron microscope, an atomic force microscope, a tomography apparatus, an X-ray tomography apparatus, a magnetic resonance tomography apparatus, and/or an optical coherence tomography apparatus.

12. A non-transitory computer-readable medium having instructions for execution by a computer for identifying at least one mechanical parameter called a "target parameter" of an object subjected to a mechanical stress, wherein said non-transitory computer-readable medium instructions comprising:
Step 1: acquiring, by an imaging means, at least two digital images of the object taken before and during an application of the mechanical stress and measuring a scale factor of the object;
Step 2: calculating a first functional $T_{CIN}(U_{CIN})$ corresponding to a correlation of the at least two digital images depending on a displacement field $U_{CIN}$ represented using a first kinematic base, said displacement field $U_{CIN}$ being measured at any point of the object under stress between the at least two digital images of the object under load and without load;
Step 3: calculating a calculated displacement field $U_{CAL}$ at any point of the object;
Step 4: calculating a second functional $T_{CAL}(U_{CAL},\{p\},\{q\})$ on a basis of the calculated displacement field $U_{CAL}$ represented using a second kinematic base, this second functional corresponding to a variational formulation of a mechanical model of the stress depending on a geometry of the object, forces applied, boundary conditions, at least a target parameter $\{p\}$ and predetermined mechanical parameters $\{q\}$;
Step 5: calculating a third functional $T_{PAR}(U_{CIN},U_{CAL})$ in a form of a quadratic norm, equal to a difference between $U_{CIN}$ and $U_{CAL}$; and
Step 6: minimizing, with respect to $U_{CIN}$, $U_{CAL}$ and $\{p\}$, a total functional $T_{TOT}(U_{CIN},U_{CAL},\{p\},\{q\})$ comprising at least the terms:

$$T_{TOT}(U_{CIN},U_{CAL},\{p\},\{q\})=\alpha T_{CIN}(U_{CIN})+\beta T_{CAL}(U_{CAL},\{p\},\{q\})+\gamma T_{PAR}(U_{CIN},U_{CAL}) \; \alpha,\alpha \text{ and } \gamma$$
being three non-zero weighting coefficients, wherein the step of minimizing with the computer identifies the "target parameter" that relates to at least one of the following: a mechanical property of a constitutive material of the object, one or more phases of the object, a geometry of the object, and/or quantities of the object; and
wherein the imaging means comprises at least one of the following: a video camera, a still camera, a scanning electron microscope, an atomic force microscope, a tomography apparatus, an X-ray tomography apparatus, a magnetic resonance tomography apparatus, and/or an optical coherence tomography apparatus.

* * * * *